United States Patent
Chang et al.

(10) Patent No.: US 9,083,488 B1
(45) Date of Patent: Jul. 14, 2015

(54) EXTENDER AND METHOD OF RECOVERING DIFFERENTIAL SIGNAL

(71) Applicant: ATEN International Co., Ltd., New Taipei (TW)

(72) Inventors: Sheng-Chiang Chang, New Taipei (TW); Sin-Hong Chen, Miaoli County (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 14/555,537

(22) Filed: Nov. 26, 2014

(51) Int. Cl.
  *H04L 7/04* (2006.01)
  *H04L 7/00* (2006.01)
(52) U.S. Cl.
  CPC ............ *H04L 7/0008* (2013.01); *H04L 7/0083* (2013.01)
(58) Field of Classification Search
  None
  See application file for complete search history.

(56) References Cited

U.S. PATENT DOCUMENTS

| 8,363,707 | B2 | 1/2013 | Hollis | |
| 2009/0239559 | A1* | 9/2009 | Hollis | 455/500 |
| 2013/0223293 | A1* | 8/2013 | Jones et al. | 370/276 |
| 2014/0211095 | A1* | 7/2014 | Dickens et al. | 348/723 |
| 2014/0325584 | A1* | 10/2014 | Cristea et al. | 725/127 |

OTHER PUBLICATIONS

Gefen, LLC, "GTV-HDBT-CAT5 User Manual", gefentv.com, 2013, Rev A3, Chatsworth, CA.

* cited by examiner

*Primary Examiner* — Adolf Dsouza
(74) *Attorney, Agent, or Firm* — Chen Yoshimura LLP

(57) ABSTRACT

An extender includes a transmitter and a receiver for transmitting a first and a second differential data signals and a differential clock signal. The transmitter combines a positive clock signal of a differential clock signal with a first differential data signal and combines a negative clock signal of the differential clock signal with a second differential data signal, thereby respectively forming a first and a second composite differential signals. The receiver includes a first impedance unit extracting the positive clock signal from the first composite differential signal, a second impedance unit extracting the negative clock signal from the second composite differential signal, and a recovery unit receiving the positive and negative clock signals and forming the differential clock signal. The frequency of the extracted first and second differential data signals are ten times or more of the frequency of the differential clock signal.

10 Claims, 5 Drawing Sheets

EXTENDER AND METHOD OF RECOVERING DIFFERENTIAL SIGNAL

BACKGROUND OF THE INVENTION

1. Field of the Invention

The invention relates to signal transmission; in particular, to an extender capable of transmitting Transition Minimized Differential Signaling (TMDS) signal and other types of signals simultaneously through one Cat.5 transmission cable and a differential signal recovering method thereof.

2. Description of the Prior Art

In recent years, with the progress of technology, the multimedia technology has been developed quite rapidly. For example, the high-definition multimedia interface (HDMI) is capable of integrating and transmitting audio and video by using single cable (e.g., a Cat.5 transmission cable or HDMI cable) to transmit uncompressed audio signals and high definition video signals (e.g., TMDS signal); therefore, no procedures of analog-to-digital (A/D) conversion or digital-to-analog (D/A) conversion are necessary so as to achieve the goal of undistorted output.

However, since one Cat.5 transmission cable has only four pairs of differential wires, and all four pairs of differential wires of the Cat.5 transmission cable are used to transmit three differential data signals and a differential clock signal of the TMDS signal, other signals such as display data channel (DDC) signal, universal serial bus (USB) signal, a sound signal, keyboard signal, and mouse signal cannot be transmitted, unless a second Cat.5 transmission cable is incorporated. Accordingly, two Cat. 5 transmission cables are typically utilized in conventional extender configurations for extending HDMI signal.

Although there has been proposals where a positive clock signal and a negative clock signal of the differential clock signal are separated and respectively combined with two of the three pairs of data differential signals thereby leaving one pair of wires to transmit other signals, this configuration has complicated circuit layout and high cost because not only the adder units and operational amplifiers are necessary in the transmitter but signal compensation units and decoding units are also necessary in the receiver.

Therefore, there is a need to provide an extender and a differential signal recovering method to solve the above-mentioned problems occurred in the prior arts.

SUMMARY OF THE INVENTION

An embodiment of the invention is an extender. In this embodiment, the extender is used for transmitting a plurality of differential signals from a local end to a remote end. The plurality of differential signals includes a first differential data signal, a second differential data signal, and a differential clock signal. The extender includes a transmitter and a receiver. The transmitter is used for combining a positive clock signal of the differential clock signal with the first differential data signal and combining a negative clock signal of the differential clock signal with the second differential data signal to form a first composite differential signal and a second composite differential signal, respectively. The receiver is used for receiving and extracting the first differential data signal and the second differential data signal from the first composite differential signal and the second composite differential signal. The receiver includes a first impedance unit, a second impedance unit, and a recovery unit. The first impedance unit is used for extracting the positive clock signal from the first composite differential signal. The second impedance unit is used for acquiring the negative clock signal from the second composite differential signal. The recovery unit is coupled to the first impedance unit and the second impedance unit and used for receiving and recovering the positive clock signal and the negative clock signal and forming the differential clock signal based on the positive clock signal and the negative clock signal, wherein, the frequencies of the extracted first differential data signal and the extracted second differential data signal are ten times or more than the frequency of the differential clock signal.

In an embodiment, the transmitter includes a first converting unit, a first pair of wires, a second converting unit, and a second pair of wires. The first converting unit is used for receiving the positive clock signal and converting the positive clock signal into a pair of positive clock signals. The first pair of wires is coupled to the first converting unit and used for receiving the pair of positive clock signals. The second converting unit is used for receiving the negative clock signal and converting the negative clock signal into a pair of negative clock signals. The second pair of wires is coupled to the second converting unit and used for receiving the pair of negative clock signals.

In an embodiment, the transmitter further includes a first buffer unit and a second buffer unit. The first buffer unit is used for receiving the first differential data signal and outputting a first positive signal and a first negative signal of the first differential data signal to a third pair of wires, and is directly coupled to the first pair of wires to receive the positive clock signal to mix the first positive signal with one positive clock signal, and to mix the first negative signal with another positive clock signal. The second buffer unit is used for receiving the second differential data signal and outputting a second positive signal and a second negative signal of the second differential data signal to a fourth pair of wires, and is directly coupled to the second pair of wires to mix the second positive signal with one negative clock signal of the pair of negative clock signals and to mix the second negative signal with another negative clock signal of the pair of negative clock signals.

In an embodiment, the plurality of differential signals further includes a third differential data signal, which is also a TMDS signal and at least one data signal. A transmission cable including four pairs of differential signal wires is coupled between the transmitter and the receiver. Three pairs of differential signal wires are used to transmit TMDS signals including the first composite differential signal, the second composite differential, and the third differential data signal respectively, and the fourth pairs of differential signal wires is used to transmit the at least one data signal for other purpose.

In an embodiment, the at least one data signal is one or a combination of at least two selected from a display data channel (DDC) signal, a universal serial bus (USB) signal, a sound signal, a keyboard signal, and a mouse signal.

In an embodiment, the receiver further includes a first differential recovery unit and a second differential recovery unit. The first differential recovery unit is used for receiving the first composite differential signal and extracting positive clock from the first composite differential signal. The second differential recovery unit is used for receiving the second composite differential signal and extracting negative clock from the second composite differential signal.

In an embodiment, the first impedance unit includes a first resistor and a second resistor coupled in parallel. One terminal of the first resistor receives a first composite signal of the first composite differential signal and another terminal of the first resistor is coupled to the recovery unit. One terminal of the second resistor receives a second composite signal of the first composite differential signal and the other terminal of the second resistor is coupled to the recovery unit. The first resistor and the second resistor extract the positive clock signal from the first composite signal and the second composite signal and output the positive clock signal to the recovery unit.

In an embodiment, the second impedance unit includes a third resistor and a fourth resistor coupled in parallel. One terminal of the third resistor receives a third composite signal of the second composite differential signal and the other terminal of the third resistor is coupled to the recovery unit. One terminal of the fourth resistor receives a fourth composite signal of the second composite differential signal and the other terminal of the fourth resistor is coupled to the recovery unit. The third resistor and the fourth resistor extract the negative clock signal from the third composite signal and the fourth composite signal and output the negative clock signal to the recovery unit.

In an embodiment, the first impedance unit and the second impedance unit further include impedance elements coupled in parallel respectively, each impedance element being a combination of resistors, inductors, capacitors coupled in parallel and/or coupled in series.

Another embodiment of the invention is a differential signal recovering method. The differential signal recovering method includes steps of: using a first differential recovery unit to receive a first composite differential signal and to extract a first differential data signal from the first composite differential signal; using a second differential recovery unit to receive a second composite differential signal and to extract a second differential data signal from the second composite differential signal; using a first impedance unit to receive the first composite differential signal and to generate a positive clock signal; using a second impedance unit to receive the second composite differential signal and to generate a negative clock signal; and using a recovery unit to receive the positive clock signal and the negative clock signal and to form the differential clock signal from the positive clock signal and the negative clock signal. Wherein, the frequencies of the extracted first differential data signal and the extracted second differential data signal are ten times or more than the frequency of the differential clock signal.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is an extender. In this embodiment, the extender can transmit a composite differential signal to remote end, and the composite differential signal can include TMDS signals and other types of data signals, but not limited to this.

Figure 1:
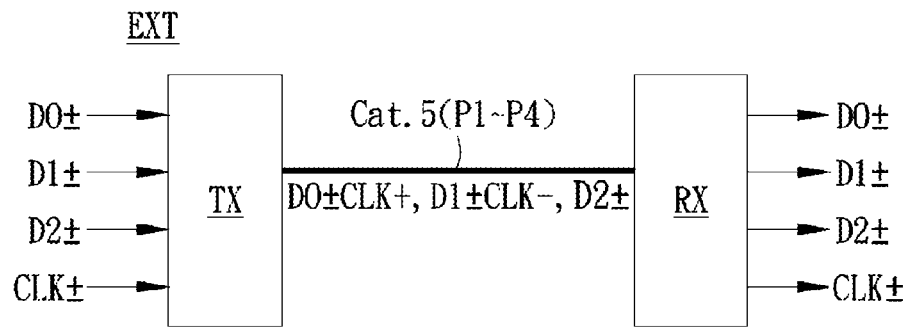
FIG. 1 illustrates a schematic diagram of the extender in an embodiment of the invention.

Please refer to FIG. 1, which illustrates a schematic diagram of the extender in this embodiment. As shown in FIG. 1, the extender EXT includes a transmitter TX, a transmission medium and a receiver RX. In practical applications, the transmission medium can be a transmission cable having a plurality of twisted pairs, which can include, but is not limited to, Cat. 5 or Cat. 6 transmission cable. In this embodiment, the transmission medium is a Cat. 5 transmission cable including four pairs of differential signal transmission wires P1~P4, and the Cat. 5 transmission cable is coupled between the transmitter TX and the receiver RX.

In this embodiment, the transmitter TX is coupled to a multi-media source which includes, but is not limited to, a computer or a multi-media player, such as a DVD player. The transmitter TX can receive a multi-media signal provided from the multi-media source wherein the multi-media signal is a HDMI signal in this embodiment. In alternative applications, the multi-media signal can also include, but is not limited to, a DVI signal or a display port signal. The multi-media signal comprises a plurality of differential signals such as TMDS signals. In an embodiment, the plurality of differential signals includes a first differential data signal D0±, a second differential data signal D1±, a third differential data signal D2±, and a differential clock signal CLK±. In addition, the multi-media signal further comprises a plurality of control signals. In an embodiment, the frequencies of the first differential data signal D0±, the second differential data signal D1±, and the third differential data signal D2± are ten times or more than the frequency of the differential clock signal CLK±. The first differential data signal D0± includes a first positive signal D0+ and a first negative signal D0−; the second differential data signal D1± includes a second positive signal D1+ and a second negative signal D1−; the third differential data signal D2± includes a third positive signal D2+ and a third negative signal D2−, and the differential clock signal CLK± includes a positive clock signal CLK+ and a negative clock signal CLK−.

Figure 2A:
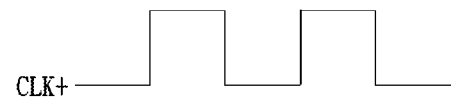
FIG. 2A and FIG. 2B illustrate schematic diagrams of the positive clock signal and the negative clock signal in this embodiment.
Figure 2C:
FIG. 2C illustrates schematic diagrams of the first positive signal in the first differential data signal and the second positive signal in the second differential data signal in this embodiment.
Figure 2B:
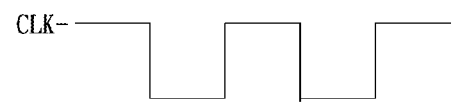
Figure 2D:
FIG. 2D illustrates schematic diagrams of the first negative signal in the first differential data signal and the second negative signal in the second differential data signal in this embodiment.
Figure 2E:
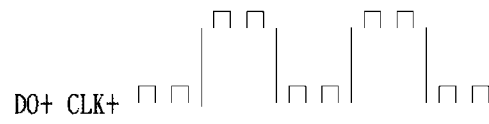
FIG. 2E and FIG. 2F illustrate schematic diagrams of the first composite signal and the second composite signal in the first composite differential signal.
Figure 2F:
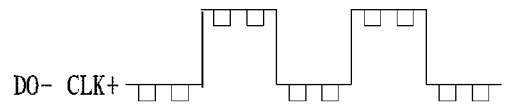
Figure 2G:
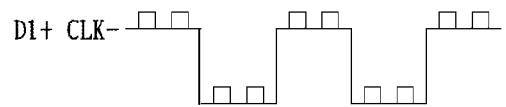
FIG. 2G and FIG. 2H illustrate schematic diagrams of the third composite signal and the fourth composite signal in the second composite differential signal.
Figure 2H:
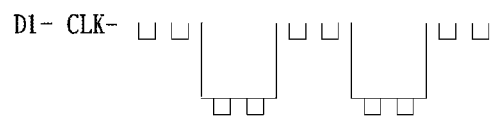

Please refer to FIG. 2A through FIG. 2D. FIGS. 2A and 2B illustrate schematic diagrams of the positive clock signal CLK+ and the negative clock signal CLK− in this embodiment. FIG. 2C illustrates schematic diagrams of the first positive signal D0+ in the first differential data signal D0± and the second positive signal D1+ in the second differential data signal D1± in this embodiment. FIG. 2D illustrates schematic diagrams of the first negative signal D0− in the first differential data signal D0± and the second negative signal D1− in the second differential data signal D1± in this embodiment. In this embodiment, the transmitter TX will extract the positive clock signal CLK+ from the differential clock signal CLK± and combines the positive clock signal CLK+ with the first differential data signal D0± respectively. In an embodiment, the positive clock signal CLK+ is converted into a pair of positive clock signals 2CLK+ and then one positive clock signal CLK+ is combined with the first differential data signal D0+, while the other positive clock signal CLK+ is combined with the first differential data signal D0− thereby forming a first composite differential signal D0±CLK+, which includes a first composite signal D0+CLK+ and a second composite signal D0−CLK+ as shown in FIG. 2E and FIG. 2F. The transmitter TX will also extract the negative clock signal CLK− from the differential clock signal CLK± and overlap the negative clock signal CLK− with the second differential data signal D1± respectively. In an embodiment, the negative clock signal CLK− can be converted into a pair of negative clock signals 2CLK− and then one negative clock signal CLK− is combined with the second differential data signal D1+ while the other negative clock signal CLK− is combined with the first differential data signal D1− thereby forming a second composite differential signal D1±CLK−, which includes a third composite signal D1+CLK− and a fourth composite signal D1−CLK− as shown in FIG. 2G and FIG. 2H.

It should be noted that although the pair of positive clock signals 2CLK+ and the pair of negative clock signals 2CLK− mentioned above are combined with the first differential data signal D0± and the second differential data signal D1± respectively, it is not limited to combining CLK± with the first differential data signal D0± and the second differential data signal D1±. In alternative embodiment, the transmitter TX of the extender EXT in the invention can combine the pair of positive clock signals 2CLK+ and the pair of negative clock signals 2CLK− with any two differential signals selected from the first differential data signal D0+, the second differential data signal D1±, and the third differential data signal D2±.

After the transmitter TX forms the first composite differential signal D0±CLK+ and the second composite differential signal D1±CLK−, the transmitter TX will transmit the first composite differential signal D0±CLK+ and the second composite differential signal D1±CLK− to the receiver RX through the transmission cable Cat.5.

As shown in FIG. 1, the transmitter TX can transmit the first composite differential signal D0±CLK+ and the second composite differential signal D1±CLK− to the receiver RX respectively through any two pairs of differential signal transmission wires such as the first pair of differential signal transmission wires P1 and the second pair of differential signal transmission wires P2 among the four pairs of differential signal transmission wires P1~P4 of the transmission cable Cat.5, for example. In addition, the transmitter TX can transmit the third differential data signal D2± to the receiver RX through any remaining pair of differential signal transmission wires such as the third pair of differential signal transmission wires P3 or the fourth pair of differential signal transmission wires P4, for example. And, the remaining pair of differential signal transmission wires of the transmission cable Cat.5, for example, the fourth pair of the differential signal transmission wires, can be used to transmit other signals such as the plurality of control signals following the HDMI specification, e.g., HPD, CEC and etc.

Figure 5:
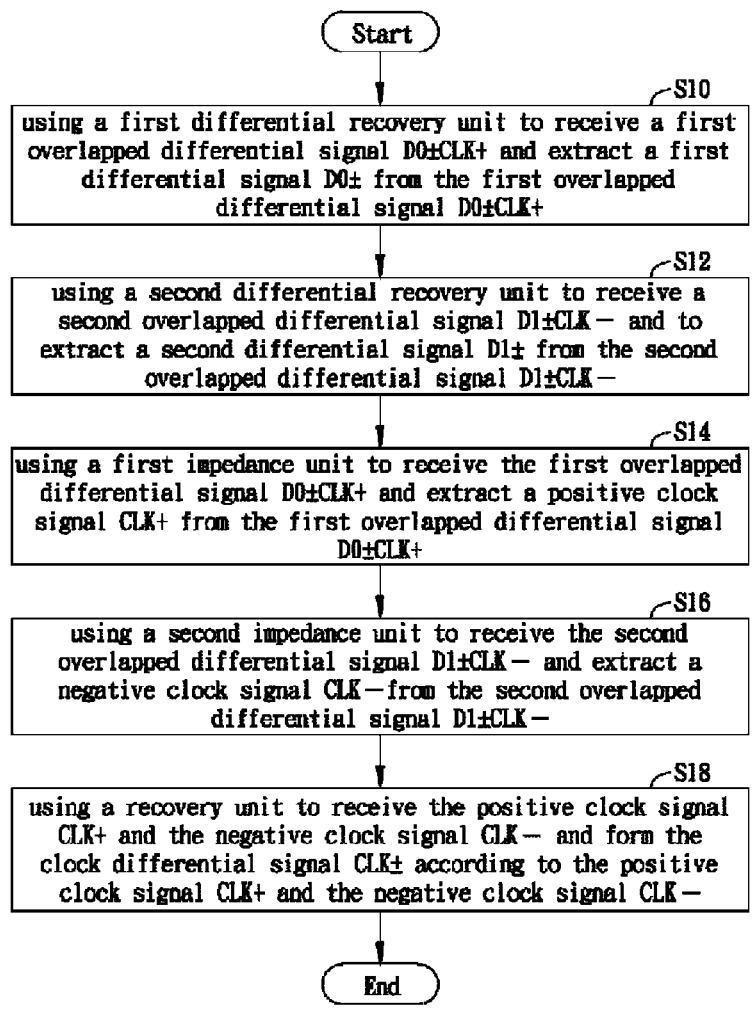
FIG. 5 illustrates a flowchart of the differential signal recovering method in another embodiment of the invention.

When the receiver RX receives the first composite differential signal D0±CLK+, the second composite differential signal D1±CLK−, and the third differential data signal D2±, the receiver RX will extract the positive clock signal CLK+ and the negative clock signal CLK− from the first composite differential signal D0±CLK+ and the second composite differential signal D1±CLK− respectively, and form the differential clock signal CLK± based on the positive clock signal CLK+ and the negative clock signal CLK−, which is shown in FIG. 5.

As shown in FIG. 5, in the step S10, a first differential recovery unit arranged within the receiver RX receives and processes the first composite differential signal D0±CLK+ and outputs the first differential data signal D0±. In the step S12, a second differential recovery unit arranged within the receiver RX receives and processes the second composite differential signal D1±CLK− and outputs the second differential data signal D1±. It should be noted that although the step S10 is illustrated to be performed before the step S12, the steps S10 and S12 can be also performed at the same time.

In the step S14, a first impedance unit arranged within the receiver RX receives the first composite differential signal D0±CLK+ and extracts the positive clock signal CLK+ from the first composite differential signal D0±CLK+. In the step S16, a second impedance unit arranged within the receiver RX receives the second composite differential signal D1±CLK− and extracts the negative clock signal CLK− from the second composite differential signal D1±CLK−. It should be noted that although the step S14 is illustrated to be performed before the step S16, the steps S14 and S16 can be also performed at the same time. In addition, the steps S10~S12 and the steps S14~S16 can be performed at the same time.

At last, in the step S18, a recovery unit arranged within the receiver RX receives the positive clock signal CLK+ and the negative clock signal CLK− and combines the positive clock signal CLK+ and the negative clock signal CLK− to form the differential clock signal CLK±. On the other hand, the receiver RX also removes the positive clock signal CLK+ in the first composite differential signal D0±CLK+ to output the first differential data signal D0+ and removes the negative clock signal CLK− in the second composite differential signal D1±CLK− to output the second differential data signal D1±.

Therefore, the receiver RX can recover the first differential data signal D0±, the second differential data signal D1±, the third differential data signal D2±, and the differential clock signal CLK±. In one embodiment, the receiver RX can output the TMDS signal including the first differential data signal D0±, the second differential data signal D1±, the third differential data signal D2±, and the differential clock signal CLK± to a video signal output apparatus which includes, but is not limited to a television, a combination of television and audio equipment, or a combination of projection equipment and audio equipment.

Figure 3:
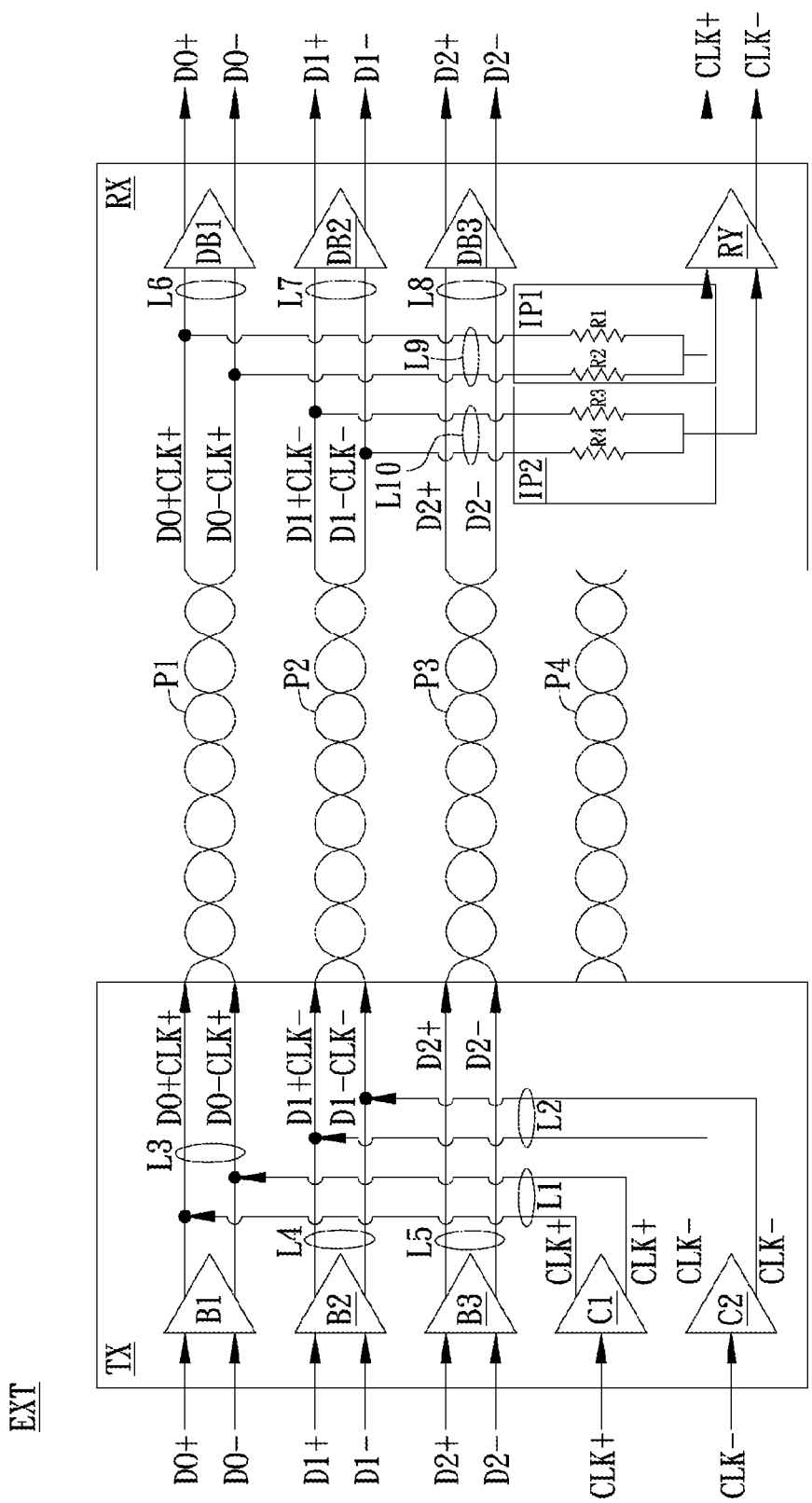
FIG. 3 illustrates a detailed circuit diagram of the extender in another embodiment.

Please refer to FIG. 3 which illustrates a detailed circuit diagram of the extender EXT. As shown in FIG. 3, the extender EXT includes the transmitter TX, the four pairs of differential signal transmission wires P1~P4, and the receiver RX. Wherein, the four pairs of differential signal transmission wires P1~P4 are coupled between the transmitter TX and the receiver RX.

The transmitter TX includes a first buffer unit B1, a second buffer unit B2, a third buffer unit B3, a first converting unit C1, a second converting unit C2, a first pair of wires L1, a second pair of wires L2, a third pair of wires L3, a fourth pair of wires L4, and a fifth pair of wires L5. Wherein, the first buffer unit B1 is coupled to the first pair of differential data signal transmission wire P1 through the third pair of wires L3; the second buffer unit B2 is coupled to the second pair of differential data signal transmission wire P2 through the fourth pair of wires L4; the third buffer unit B3 is coupled to the third pair of differential data signal transmission wire P3 through the fifth pair of wires L5; the first converting unit C1 is coupled to the third pair of wires L3 through the first pair of wires L1; the second converting unit C2 is coupled to the fourth pair of wires L4 through the second pair of wires L2. In an embodiment, one terminal of the first pair of wires L1 is directly connected to the third pair of wires L3. Likewise, one terminal of the second pair of wires L2 is directly connected to the fourth pair of wires L4.

The first buffer unit B1 is used to receive the first differential data signal D0± and output the first positive signal D0+ and the first negative signal D0− to the third pair of wires L3. The second buffer unit B2 is used to receive the second differential data signal D1± and output the second positive signal D1+ and the second negative signal D1− to the fourth pair of wires L4. The third buffer unit B3 is used to receive the third differential data signal D2+ and output the third positive signal D2+ and the third negative signal D2− to the fifth pair of wires L5.

The first converting unit C1 receives the positive clock signal CLK+ and converts the positive clock signal CLK+ into a pair of positive clock signals 2CLK+, which are outputted to the first pair of wires L1 respectively. Because the first pair of wires L1 is directly connected to the third pair of wires L3, the first pair of wires L1 will transmit the pair of positive clock signals 2CLK+ to the third pair of wires L3 respectively. When the third pair of wires L3 receives the first positive signal D0+ and the first negative signal D0− from the first buffer unit B1 and the pair of positive clock signals 2CLK+ from the first pair of wires L1 respectively, the first positive signal D0+ and one positive clock signal CLK+ of the pair of positive clock signals 2CLK+ will be combined to form the composite signal D0+CLK+ and the first negative signal D0− and the other positive clock signal CLK+ of the pair of positive clock signals 2CLK+ will be combined to form the composite signal D0−CLK+. The composite signals D0+CLK+ and D0− CLK+ outputted by the third pair of wires L3 are the first composite differential signal D0±CLK+, and the first composite differential signal D0±CLK+ is transmitted to the receiver RX through the first pair of differential data signal transmission wire P1. It is noted the D0± and CLK± belong to TMDS signals having current mode logic (CML), so, without the requirement of conventional combining element such as adder, the D0+ and CLK+ as well as D0− and CLK+ can be directly combined to formed D0+CLK+ and D0−CLK+, respectively.

In addition, the second converting unit C2 receives the negative clock signal CLK− and converts the negative clock signal CLK− into a pair of negative clock signals 2CLK−, which are outputted to the second pair of wires L2 respectively. Because the second pair of wires L2 is directly connected to the fourth pair of wires L4, the second pair of wires L2 will transmit the pair of negative clock signals 2CLK− to the fourth pair of wires L4 respectively. When the fourth pair of wires L4 receives the second positive signal D1+ and the second negative signal D1− from the second buffer unit B2 and the pair of negative clock signals 2CLK− from the second pair of wires L2 respectively, the second positive signal D1+ and one negative clock signal CLK− of the pair of negative clock signals 2CLK− will be combined to form the composite signal D1+CLK− and the second negative signal D1− and the other negative clock signal CLK− of the pair of negative clock signals 2CLK− will be combined to form the composite signal D1−CLK−. The composite signals D1+CLK− and D1−CLK− outputted by the fourth pair of wires L4 are the second composite differential signal D1+CLK−, and the second composite differential signal D1±CLK− is transmitted to the receiver RX through the second pair of differential data signal transmission wire P2. It is noted the D1± and CLK± are TMDS signals have current mode logic (CML), so, without the requirement of conventional combining element such as adder, the D1+ and CLK− as well as D1− and CLK− can be directly combined to formed D1+CLK− and D1−CLK−, respectively.

When the fifth pair of wires L5 receives the third positive signal D2+ and the third negative signal D2− from the third buffer unit B3, the fifth pair of wires L5 outputs the third positive signal D2+ and the third negative signal D2− (namely the third differential data signal D2±) to the receiver RX through the third pair of differential data signal transmission wire P3.

Since the first pair of differential data signal transmission wire P1, the second pair of differential data signal transmission wire P2, and the third pair of differential data signal transmission wire P3 of the four pairs of differential signal transmission wires P1~P4 are used to transmit the first composite differential signal D0±CLK+, the second composite differential signal D1±CLK−, and the third differential data signal D2± respectively, the remaining fourth pair of differential signal transmission wire P4 can be used to transmit at least one data signal of other types to the receiver RX.

In one embodiment, the at least one data signal can include, but should not be limited to, a display data channel (DDC) signal, a consumer electronics control (CEC) signal, a hot plug detect (HPD), an universal serial bus (USB) signal, an audio signal, a keyboard signal, and a mouse signal, or the combination of the above described signals; it can also be a differential signal. In addition, the at least one data signal can be externally generated and received by the transmitter TX, or, alternatively, internally generated by the transmitter TX.

Next, the circuit layout of the receiver RX is described. As shown in FIG. 3, the receiver RX includes a first differential recovery unit DB1, a second differential recovery unit DB2, a third differential recovery unit DB3, a recovery unit RY, a first impedance unit IP1, a second impedance unit IP2, and a sixth to a tenth pair of wires L6 to L10, wherein the first differential recovery unit DB1 is coupled to the first pair of differential data signal transmission wire P1 through the sixth pair of wires L6, the second differential recovery unit DB2 is coupled to the second pair of differential data signal transmission wire P2 through the seventh pair of wires L7, the third differential recovery unit DB3 is coupled to the third pair of differential data signal transmission wire P3 through the eighth pair of wires L8, the first impedance unit IP1 is coupled to the sixth pair of wires L6 through the ninth pair of wires L9, the second impedance unit IP2 is coupled to the seventh pair of wires L7 through the tenth pair of wires L10, and the recovery unit RY is coupled to the first impedance unit IP1 and the second impedance unit IP2.

Please refer to FIG. 3 and FIG. 5, where FIG. 5 illustrates a flowchart of the differential signal recovering method in this embodiment. As shown in FIG. 5, when the receiver of the extender receives the first composite differential signal D0±CLK+ and the second composite differential signal D1±CLK− from the transmitter through the cat.5 transmission cable, the steps S10 and S12 are simultaneously performed by using the first differential recovery unit DB1 to receive a first composite differential signal D0±CLK+ and extract a first differential data signal D0± from the first composite differential signal D0±CLK+ and using the second differential recovery unit DB2 to receive a second composite differential signal D1±CLK− and extract a second differential data signal D1± from the second composite differential signal D1±CLK−. Meanwhile, the steps S14 and S16 are simultaneously performed by using a first impedance unit IP1 to receive the first composite differential signal D0±CLK+ and generate a positive clock signal CLK+ and using a second impedance unit IP2 to receive the second composite differential signal D1±CLK− and generate a negative clock signal CLK−. Practically, known by one having ordinary skilled in the art, the above-mentioned steps S10~S16 can be performed simultaneously.

In the step S10, the first differential recovery unit DB1 receives the first composite differential signal D0±CLK+ transmitted by the first pair of differential data signal transmission wire P1 through the sixth pair of wires L6 and removes the positive clock signal CLK+ from the first composite differential signal D0±CLK+ thereby outputting the first differential data signal D0±. In the step S12, the second differential recovery unit DB2 receives the second composite differential signal D1±CLK− transmitted by the second pair of differential data signal transmission wire P2 through the seventh pair of wires L7 and removes the negative clock signal CLK− from the second composite differential signal D1±CLK− thereby outputting the second differential data signal D1±. In addition, the third differential recovery unit DB3 receives the third differential data signal D2+ transmitted by the third pair of differential data signal transmission wire P3 through the eighth pair of wires L8 and then outputs the third differential data signal D2±.

In the step S14, since the first impedance unit IP1 is coupled to the sixth pair of wires L6 through the ninth pair of wires L9, the first impedance unit IP1 can receive the first composite differential signal D0±CLK+ from the sixth pair of wires L6 and extract the positive clock signal CLK+ from the first composite differential signal D0±CLK+. Likewise, in the step S16, since the second impedance unit IP2 is coupled to the seventh pair of wires L7 through the tenth pair of wires L10, the second impedance unit IP2 can receive the second composite differential signal D1±CLK− from the seventh pair of wires L7 and extract the negative clock signal CLK− from the second composite differential signal D1±CLK−. It should be noted that the frequency of the extracted first differential data signal D0± and the extracted second differential data signal D0± are ten times or more of the frequency of the differential clock signal CLK± extracted by the first and second impedance units IP1 and IP2.

In this embodiment, the first impedance unit IP1 includes a first resistor R1 and a second resistor R2 coupled in series between the two signal line. One terminal of the first resistor R1 receives the first composite signal D0+CLK+ from the sixth pair of wires L6 and the other terminal of the first resistor R1 is coupled to the recovery unit RY. One terminal of the second resistor R2 receives the second composite signal D0−CLK+ from the sixth pair of wires L6 and the other terminal of the second resistor R2 is coupled to the recovery unit RY. The first resistor R1 and the second resistor R2 can extract the positive clock signal CLK+ from the first composite signal D0+CLK+ and the second composite signal D0−CLK+ and output the positive clock signal CLK+ to the recovery unit RY. The second impedance unit IP2 includes a third resistor R3 and a fourth resistor R4 coupled in series between the two signal line. One terminal of the third resistor R3 receives the third composite signal D1+CLK− from the seventh pair of wires L7 and the other terminal of the third resistor R3 is coupled to the recovery unit RY. One terminal of the fourth resistor R4 receives the fourth composite signal D1−CLK− from the seventh pair of wires L7 and the other terminal of the fourth resistor R4 is coupled to the recovery unit RY. The third resistor R3 and the fourth resistor R4 can extract the negative clock signal CLK− from the third composite signal D1+CLK− and the fourth composite signal D1−CLK− and output the negative clock signal CLK− to the recovery unit RY.

Then, in the step S18, the recovery unit RY is used to receive the positive clock signal CLK+ and the negative clock signal CLK− and form the differential clock signal CLK± based on the positive clock signal CLK+ and the negative clock signal CLK−. In an embodiment, the recovery unit RY, such as comparator, combines the positive clock signal CLK+ with the negative clock signal CLK− to form the differential clock signal CLK± by using the extracted CLK+ and CLK− as reference voltage to each other instead of using external reference voltages.

Figure 4:
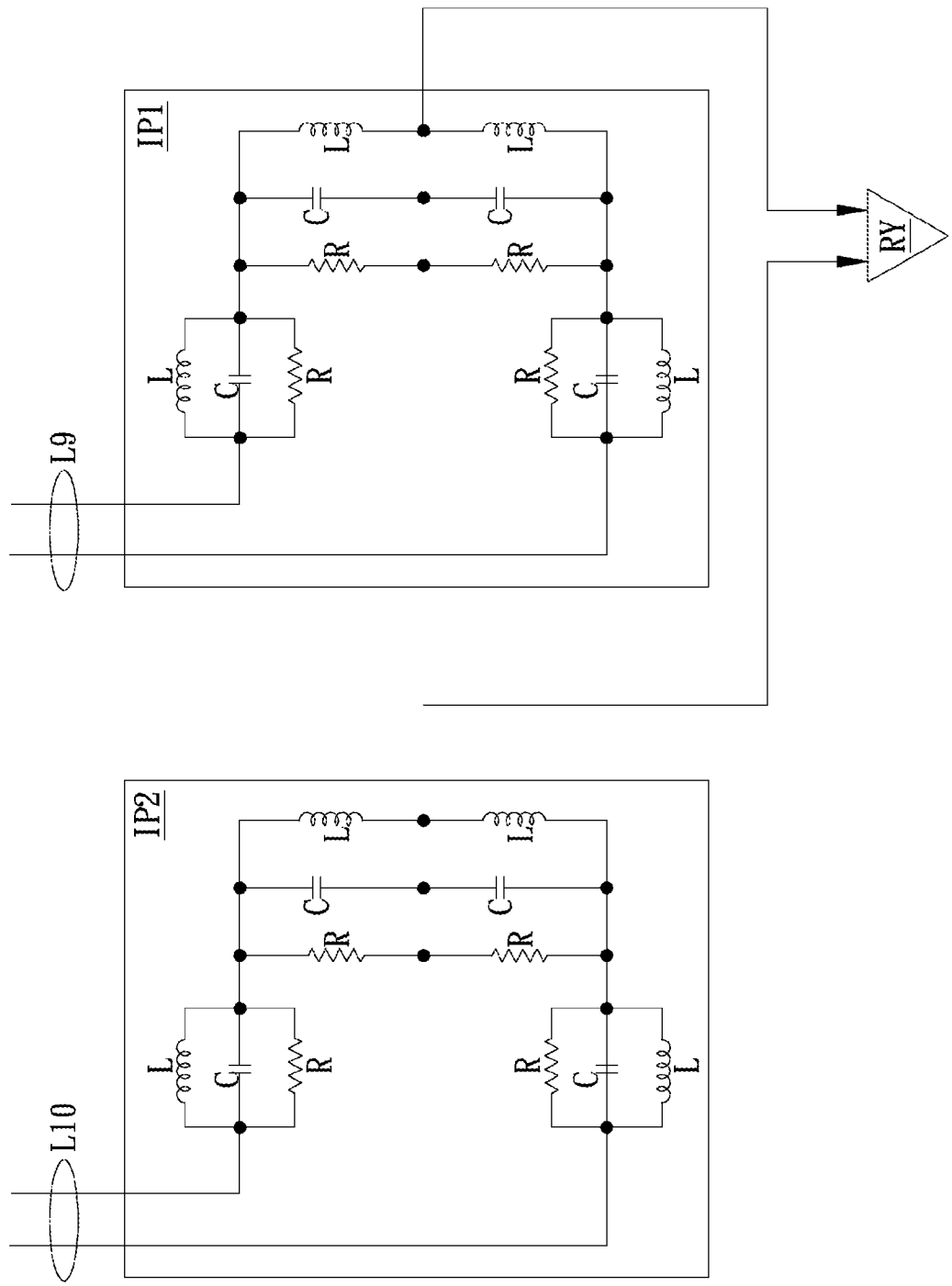
FIG. 4 illustrates a schematic diagram of the first impedance unit and the second impedance unit of the embodiment.

It should be noted that each of the first impedance unit IP1 and the second impedance unit IP2 of the receiver RX can include two impedance elements coupled in series between the two signal line, and each impedance element can be a combination of resistors, inductors, capacitors coupled in parallel and/or coupled in series, without any transistors. Therefore, in addition to the resistors coupled in series between the two signal line shown in FIG. 3, the first impedance unit IP1 and the second impedance unit IP2 can include circuits formed by resistors R, inductors L, and capacitors C coupled in series and in parallel respectively, an example of which is shown in FIG. 4.

Another embodiment of the present invention is a method of recovering a differential signal. In this embodiment, the method of recovering a differential signal is applied in a received of an extender, the received including (without limitation) a first impedance unit, a second impedance unit, and a recovery unit.

Compared to conventional technologies, the extender and the differential signal recovering method of embodiments of the invention have following advantages of:

(1) simplifying extender circuit layout, and achieving low cost, and easy verification;

(2) using a single Cat.5 transmission cable coupled between the transmitter and the receiver of the extender to transmit TMDS signals and other types of data or control signals simultaneously;

(3) directly mixing a pair of positive clock signals with the first differential data signal respectively and mixing a pair of negative clock signals with the second differential data signal respectively, without using additional circuits such as adder units; and (4) extracting the positive clock signal and the negative clock signal from the first composite differential signal and the second composite differential signal respectively through the first impedance unit and the second impedance unit and forming the differential clock signal by combining the extracted positive clock signal and negative clock signal without using complex signal processing or decoding units.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An extender, for transmitting a plurality of differential signals to a remote end, wherein the plurality of differential signals comprises a first differential data signal, a second differential data signal, and a differential clock signal, the extender comprising:

a transmitter, for combining a positive clock signal of the differential clock signal with the first differential data signal and combining a negative clock signal of the differential clock signal with the second differential data signal to form a first composite differential signal and a second composite differential signal respectively; and a receiver, for extracting the first differential data signal and the second differential data signal from the first composite differential signal and the second composite differential signal, the receiver comprising:
- a first impedance unit, for extracting the positive clock signal from the first composite differential signal;
- a second impedance unit, for extracting the negative clock signal from the second composite differential signal; and
- a recovery unit, coupled to the first impedance unit and the second impedance unit, for receiving the positive clock signal and the negative clock signal and forming the differential clock signal based on the positive clock signal and the negative clock signal;

wherein frequencies of the extracted first differential data signal and the extracted second differential data signal are ten times or more of a frequency of the differential clock signal.

2. The extender of claim 1, wherein the transmitter comprises:
- a first converting unit, for receiving the positive clock signal and converting the positive clock signal into a pair of positive clock signals;
- a first pair of wires, coupled to the first converting unit, for receiving the pair of positive clock signals;
- a second converting unit, for receiving the negative clock signal and converting the negative clock signal into a pair of negative clock signals; and
- a second pair of wires, coupled to the second converting unit, for receiving the pair of negative clock signals.

3. The extender of claim 2, wherein the transmitter further comprises:
- a first buffer unit, for receiving the first differential data signal and outputting a first positive signal and a first negative signal of the first differential data signal to a third pair of wires, wherein the third pair of wires are directly coupled to the first pair of wires to mix the first positive signal with one positive clock signal of the pair of positive clock signals and to mix the first negative signal with the other positive clock signal of the pair of positive clock signals; and
- a second buffer unit, for receiving the second differential data signal and outputting a second positive signal and a second negative signal of the second differential data signal to a fourth pair of wires, wherein the fourth pair of wires are directly coupled to the second pair of wires to mix the second positive signal with one negative clock signal of the pair of negative clock signals and to mix the second negative signal with the other negative clock signal of the pair of negative clock signals.

4. The extender of claim 1, further comprising a transmission cable having four pairs of differential signal wires coupled to the transmitter and the receiver, wherein the plurality of differential signals further comprises a third differential data signal and at least one data signal, and three of the four pairs of differential signal wires are used to transmit the first composite differential signal, the second composite differential signal, and the third differential data signal respectively, and the fourth pair of differential signal wires is used to transmit the at least one data signal.

5. The extender of claim 4, wherein the at least one data signal is one signal or a combination of at least two signals selected from a display data channel signal, a consumer electronics control signal, a hot plug detect signal, a universal serial bus signal, an audio signal, a keyboard signal, and a mouse signal, or a differential signal.

6. The extender of claim 1, wherein the receiver further comprises:
- a first differential recovery unit, for receiving the first composite differential signal and removing the positive clock signal from the first composite differential signal to output the first differential data signal; and
- a second differential recovery unit, for receiving the second composite differential signal and removing the negative clock signal from the second composite differential signal to output the second differential data signal.

7. The extender of claim 1, wherein the first impedance unit comprises a first resistor and a second resistor, a first terminal of the first resistor receives a first composite signal of the first composite differential signal and a second terminal of the first resistor is coupled to a second terminal of the second resistor and the recovery unit, a first terminal of the second resistor receives a second composite signal of the first composite differential signal, the first resistor and the second resistor extract the positive clock signal from the first composite signal and the second composite signal and output the positive clock signal to the recovery unit.

8. The extender of claim 1, wherein the second impedance unit comprises a third resistor and a fourth resistor, a first terminal of the third resistor receives a third composite signal of the second composite differential signal and a second terminal of the third resistor is coupled to a second terminal of the fourth resistor and the recovery unit, a first terminal of the fourth resistor receives a fourth composite signal of the second composite differential signal, the third resistor and the fourth resistor extract the negative clock signal from the third composite signal and the fourth composite signal and output the negative clock signal to the recovery unit.

9. The extender of claim 1, wherein the first impedance unit and the second impedance unit each comprises impedance elements coupled in parallel, and each impedance element is a combination of resistors, inductors, capacitors coupled in parallel and/or coupled in series.

10. A differential signal recovering method, comprising:
- using a first differential recovery unit to receive a first composite differential signal and to extract a first differential data signal from the first composite differential signal;
- using a second differential recovery unit to receive a second composite differential signal and to extract a second differential data signal from the second composite differential signal;
- using a first impedance unit to receive the first composite differential signal and to generate a positive clock signal;
- using a second impedance unit to receive the second composite differential signal and to generate a negative clock signal; and
- using a recovery unit to receive the positive clock signal and the negative clock signal and to form a differential clock signal based on the positive clock signal and the negative clock signal;

wherein frequencies of the extracted first differential data signal and the extracted second differential data signal are ten times or more of a frequency of the differential clock signal.

* * * * *